F. E. BRIGHT.
APPARATUS FOR MACHINING WORK PIECES.
APPLICATION FILED MAY 7, 1917. RENEWED SEPT. 9, 1921.
1,420,683.
Patented June 27, 1922.
4 SHEETS—SHEET 2.
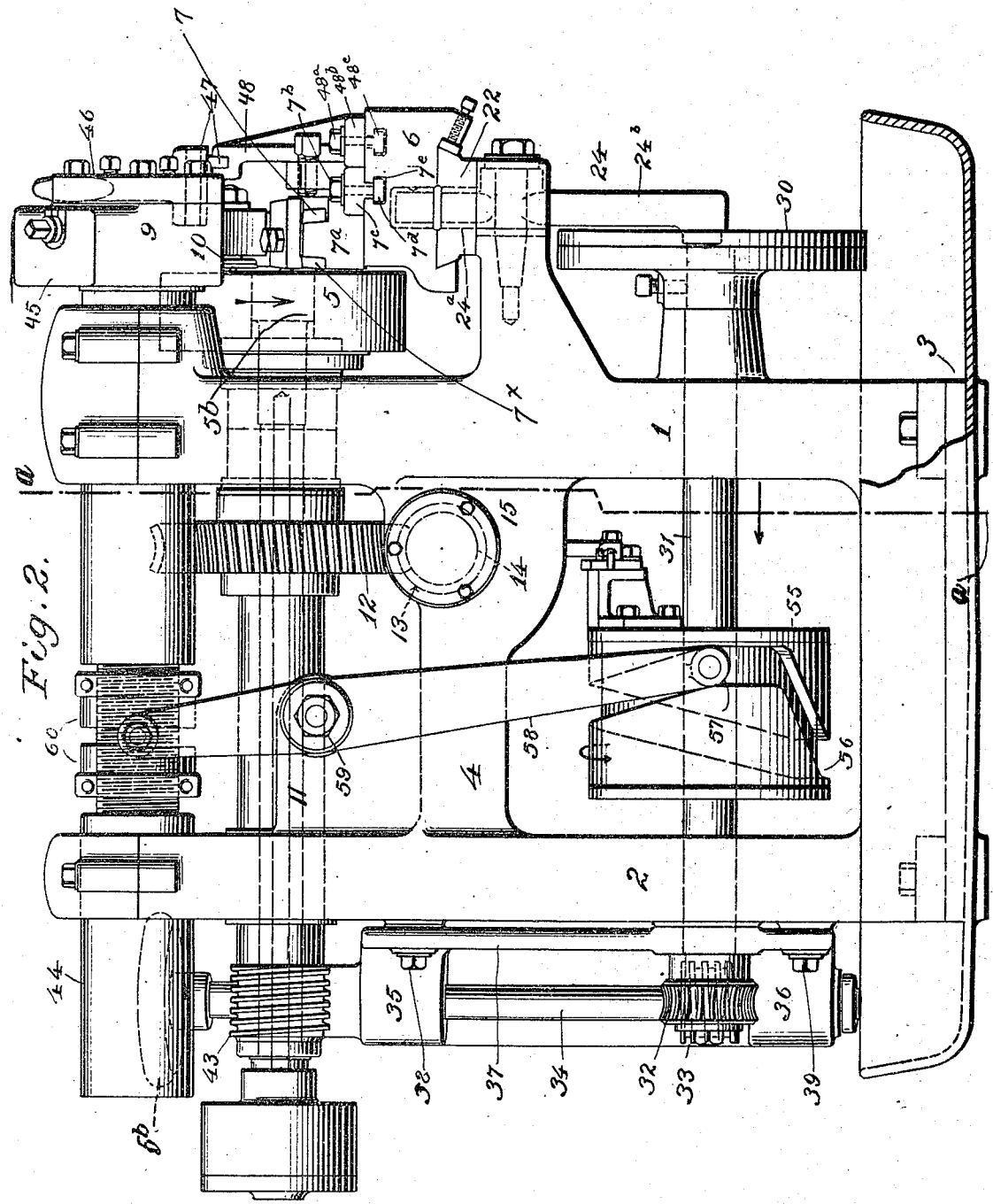

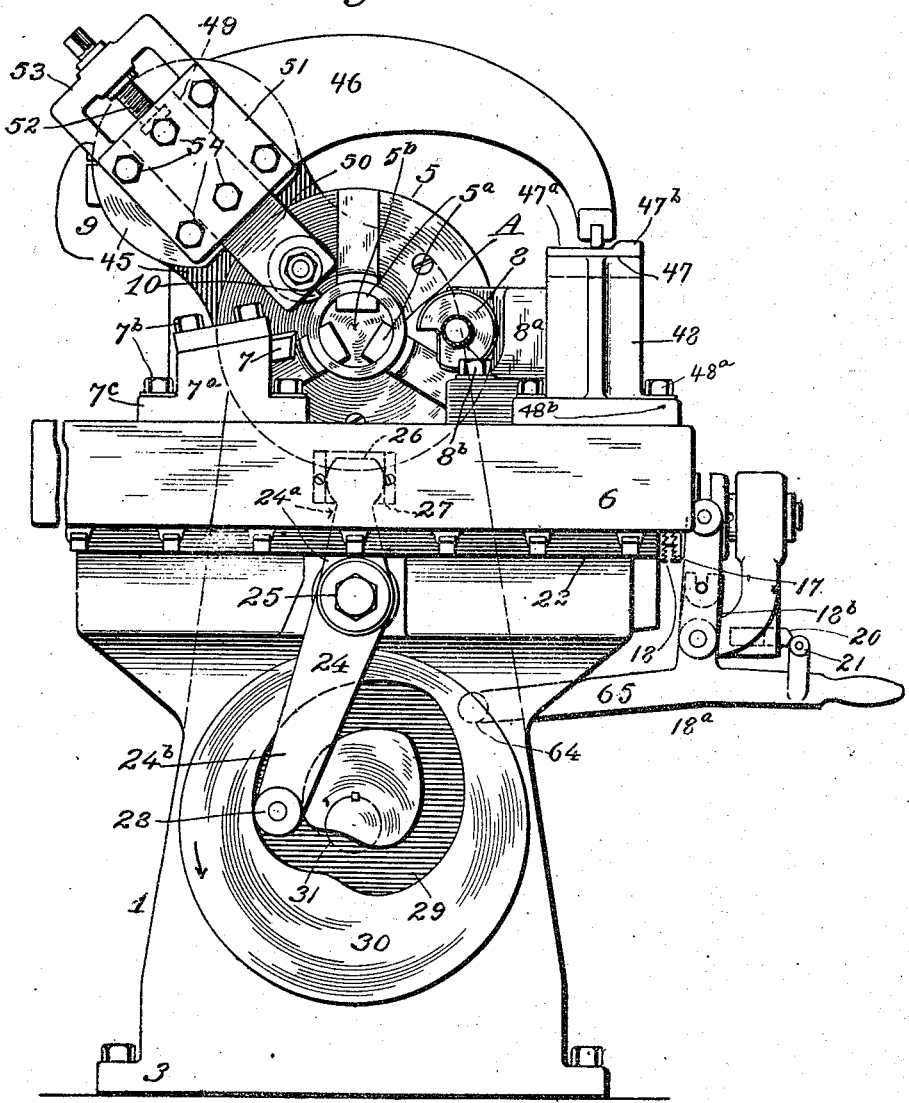

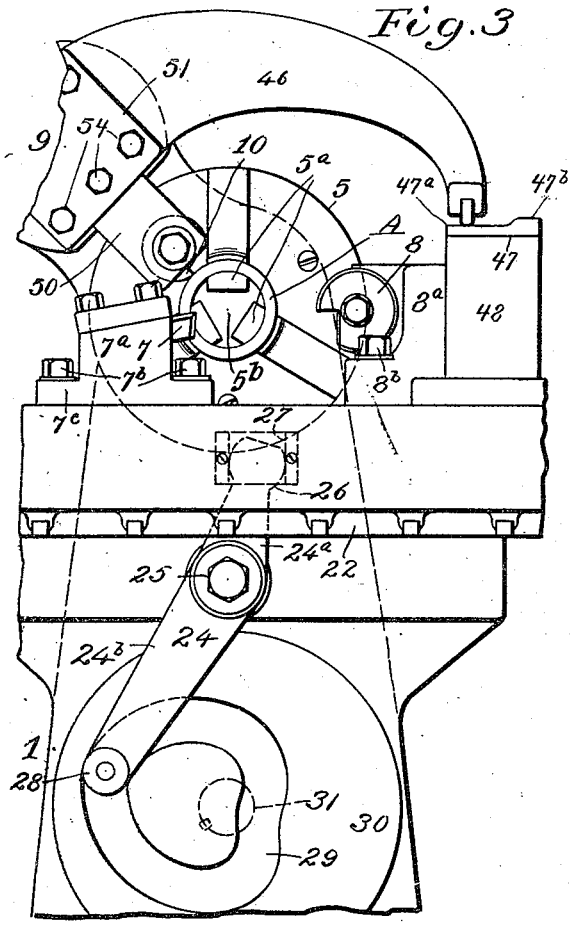
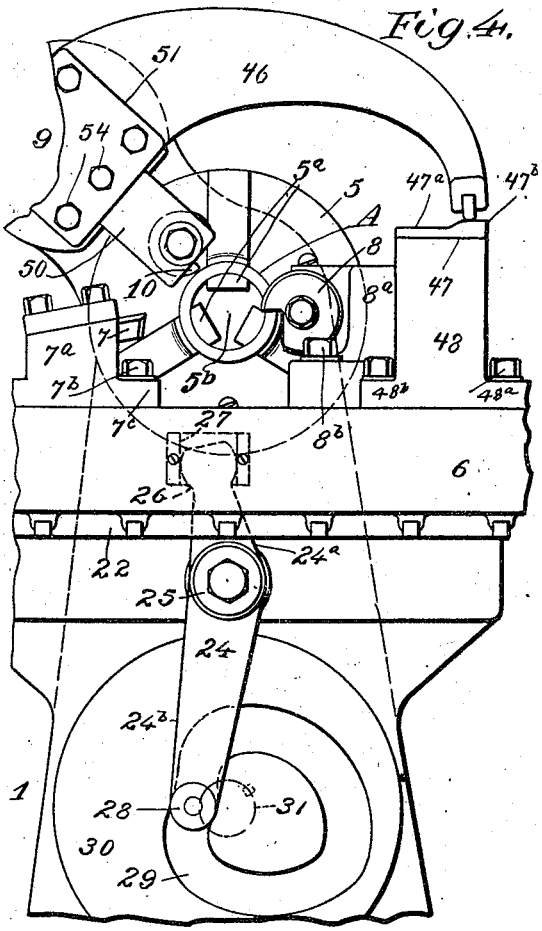
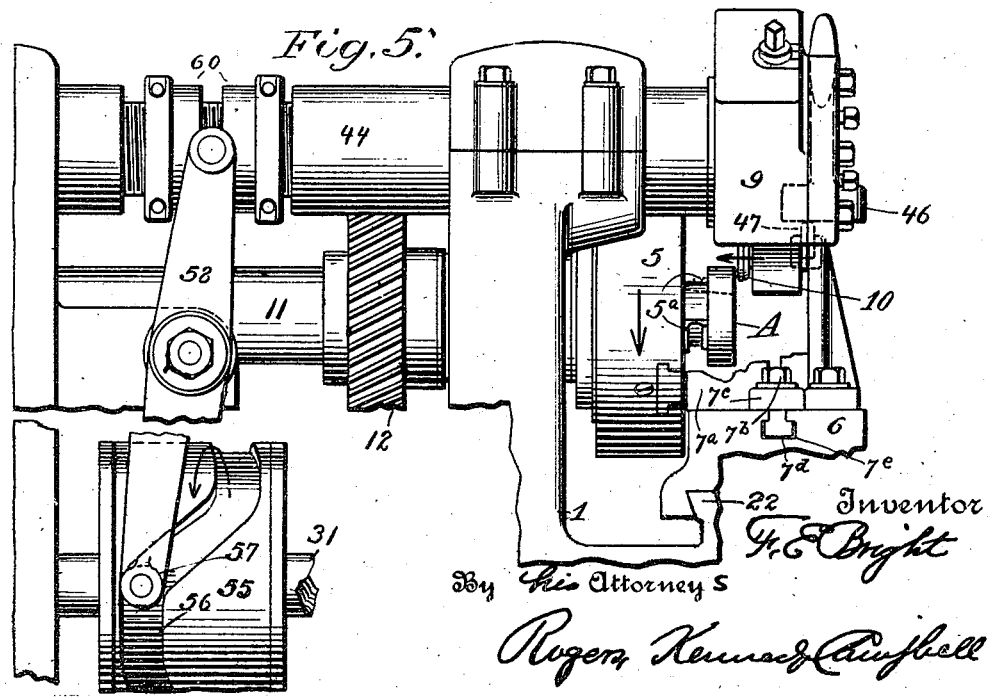

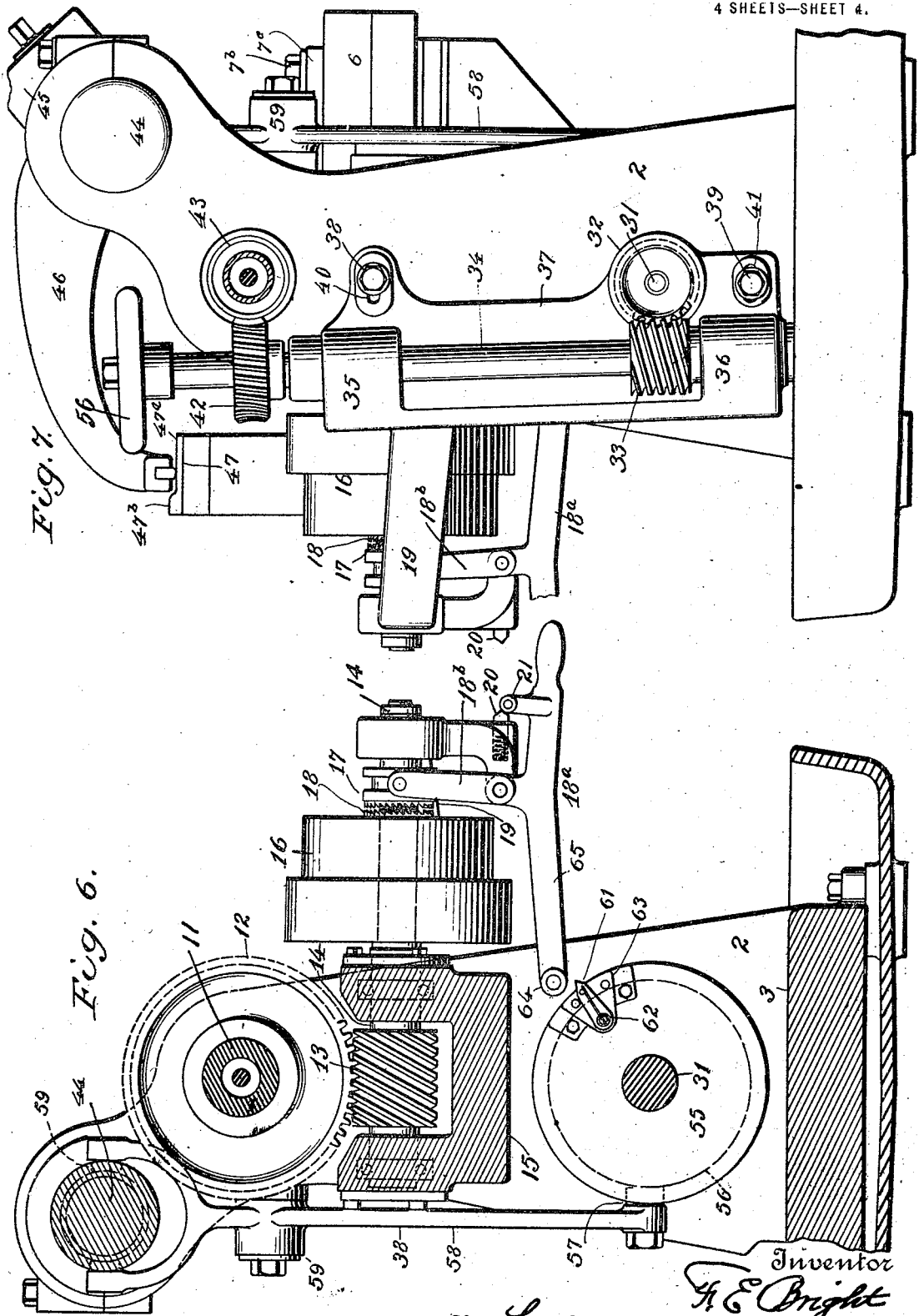

UNITED STATES PATENT OFFICE.

FRED E. BRIGHT, OF NEW YORK, N. Y.

APPARATUS FOR MACHINING WORK PIECES.

1,420,683. Specification of Letters Patent. Patented June 27, 1922.

Application filed May 7, 1917, Serial No. 166,889. Renewed September 9, 1921. Serial No. 499,550.

*To all whom it may concern:*

Be it known that I, FRED E. BRIGHT, a citizen of the United States, residing at New York, in the county of New York and State of New York, have invented certain new and useful Improvements in Apparatus for Machining Work Pieces, of which the following is a specification, reference being had therein to the accompanying drawing.

This invention relates to machines for operating on work pieces, more particularly work pieces of annular form such as rings, cylinders and the like, in order to subject the same to forming, roughing, or finishing operations and the like, and the invention consists of mechanisms of improved form and construction characterized by a suitable holder or chuck for the work mounted to be rotated to rapidly rotate the work, and one or more operating tools adapted to be automatically fed to act on the work and subject the same to the desired machining operations.

In the more specific embodiment of the invention as designed particularly for machining annular forms, such for instance as the outer casing rings of antifriction bearings to give said rings their proper and accurate external form, shape and finish, the machine comprises a rotary chuck spindle carrying a work holding chuck adapted to grip the ring internally and rotate the same so as to expose its outer and side faces; a carriage or slide movable transversely of the axis of rotation of the chuck and carrying a suitable tool or tools to act on the side face or faces of the ring; a second carriage or slide movable axially of the ring and carrying a tool to act on the peripheral surface of the same; and suitable driving means for said carriages operating in the successive rotations of the chuck and the work held thereby, to cause the tools to traverse the said face and periphery respectively of the ring and subject the same to machining operations.

In the accompanying drawings:

Fig. 1 is a front elevation of my improved machine with the parts in the position they occupy at the beginning of the cycle of operation.

Fig. 2 is a side elevation of the same.

Fig. 3 is a front elevation of the machine partly broken away, and showing the parts in the position they occupy at a further period in the cycle of operation.

Fig. 4 is a similar view showing the parts in the position they occupy at a still further period in the operation.

Fig. 5 is a side elevation partly broken away with the parts in the position they occupy in Fig. 3.

Fig. 6 is a transverse sectional elevation on the line $a-a$ of Fig. 1 as viewed from the front of the machine.

Fig. 7 is a transverse sectional elevation on the line $b-b$ of Fig. 2 as viewed from the rear.

Referring to the drawings:

The operative parts of the mechanism are mounted in and sustained by a suitable frame comprising in the present instance a front upright or standard 1, a rear upright or standard 2, which standards extend upwardly from a horizontal base plate or bed 3, and a horizontal connecting frame member 4 which connects the two standards and maintains and braces them firmly in fixed relations.

The machine comprises as its main elements a work holding chuck 5 rotatable about a horizontal axis and adapted to rotate the work piece, in the present instance the ring A, whose side and peripheral faces are to be machined; a tool slide or carriage 6 movable horizontally at the front of the chuck transversely of the axis of rotation of the same and carrying operating tools 7 and 8 adapted in the horizontal reciprocating movements of the carriage to traverse the side face of the ring and subject the same to machining operations; and a horizontal tool slide or carriage 9 movable axially of the ring and carrying an operating tool 10 adapted in the axial movements of the slide to traverse the peripheral surface of the ring. These several parts are so driven and operated, in the manner to be more particularly described hereinafter, that in each rotation or cycle of operation of the operating member for the tool slides presently to be described the tools 7 and 8 will traverse the side faces of the work in succession, the tool 8 advancing to its work while the tool 7 is retreating after having performed its work, and the tool 10 advancing and traversing the peripheral surface of the work simultaneously with the advance of the tool 7 and retreating out of engagement with the work as the tool 8 advances.

The chuck mounted on the forward end of a horizontal rotary chuck spindle 11, is in the present instance, provided with clamping jaws 5ª which are adapted to act on the interior of the ring so as to expose its outer surfaces—i. e., its front and rear faces and its peripheral face, see Fig. 5—to the action of the operating tools, said jaws being expanded so as to grip the work by means of an axially movable plunger which engages the inner sides of the jaws and which is so shaped relatively to the jaws that the axial movements of the plunger 5ᵇ will spread or expand the jaws outwardly. The chuck spindle is mounted in suitable bearings in the standards of the frame, and is rotated by means of a worm wheel 12 fixed to the spindle between the two standards and engaged by a horizontal worm 13 on a horizontal transverse driving shaft 14 mounted in bearings in a transverse frame member 15. The drive shaft has mounted loosely thereon a driving pulley 16 adapted to be rotated constantly from any suitable source of power, and at the outer side of the pulley the shaft has splined to it the outer member 17 of a connecting clutch whose inner member 18 is fixed to the driving pulley. The splined clutch member is operated by means of an operating lever 18ª pivotally mounted on a bracket 19 extending laterally from the frame of the machine, said bracket being provided with a bearing in which the outer end of the driving shaft is mounted. The lever is provided with an upright arm 18ᵇ forked at its end to engage a peripheral slot in the splined clutch member, whereby when the lever is rocked upwardly at its outer end the clutch member will be thrust inwardly and will effect connection with the driving pulleys and thereby cause the rotation of the same to be imparted to the driving shaft, the lever being held in this position yieldingly for the time being by means of a spring actuated bevel pin 20 projecting outwardly from the bracket and adapted to be engaged by a roller 21 on the lever. The clutch thus engaged is adapted to be automatically disengaged when the operating member for the tool slides makes a complete revolution as will be presently described.

The tool slide 6 is mounted to slide horizontally in a transverse direction on a horizontal transverse supporting guide 22 fixedly sustained by the front standard 1. The supporting guide 22 is provided on its upper side with a dovetail and the slide is provided with a groove of corresponding form to receive said dovetail, and is reciprocated back and forth to effect the feeding action of the tools 7 and 8 by operating mechanism more particularly described hereinafter.

The operating tool 7 is mounted in a suitable head 7ª seated on the upper side of the slide, which head is adjustable longitudinally thereof by means of clamping bolts 7ᵇ extending through feet 7ᶜ on the head and provided with heads 7ᵈ which engage loosely in an undercut groove 7ᵉ extending longitudinally of the slide, whereby by loosening the bolts the heads may be adjusted longitudinally of the slide and may be again fastened firmly in position thereon in its proper position of adjustment by again tightening up the bolt.

This tool 7 is adapted when the slide is fed in one direction (to the right in Fig. 1) to traverse the front side face of the rotating ring and thereby subject the same to a roughing operation, the tool being of such character in the present instance as to effect the rough cutting of the ring.

The operating tool 8 is carried by a head 8ª seated on the upper side of the slide 6 and secured thereto so that it may be adjusted longitudinally thereof by clamping bolts 8ᵇ having their heads engaged in the undercut groove 7ᵉ in the slide and adapted to be operated similar to the clamping bolts 7ᵇ to permit of the adjustments of the head in a manner similar to the adjustments of the head 7ª. This tool 8 is adapted when the slide is fed to the left in Fig. 1 to traverse the front side face of the ring A, and in this particular instance the tool is of such character that it will subject the surface roughened by the tool 7 to a finishing operation. It is seen therefore that in the reciprocations of the slide, the outer side of the ring will be subjected in succession to two machining operations, first a roughing operation by the tool 7 and secondly a finishing operation by the tool 8.

The reciprocating motions of the slide are imparted thereto by means of a vertical rocking member in the form of a lever 24 pivoted between its ends on a horizontal fore and aft axis 25 to the frame, the upper arm 24ª of the lever being provided with a head 26 loosely engaging in a socket 27 on the slide 6. The lower arm 24ᵇ of the lever has journaled on its lower end a roller 28 which engages in a cam groove 29 formed in a disk 30 fixed to the forward end of a horizontal fore and aft extending cam shaft 31 mounted in suitable bearings in the two frame standards. The cam groove 29 is of such form and contour that, as the cam shaft 31 is rotated, the lever 24 will be rocked on its axis and will thereby reciprocate the slide, moving the same from a starting position, first to the right to cause the roughing tool 7 to traverse the work, and then to the left to cause the retreat of the roughing tool and the advance of the finishing tool 8 to traverse the work.

The rear end of the cam shaft projects rearwardly beyond the rear frame standard at which point it has fixed to it a worm wheel 32 engaged by a worm 33 on a vertical rotary shaft 34 mounted in upper and lower bearings 35 and 36 on a bracket 37. This bracket is formed near its lower end with an opening which loosely surrounds the cam shaft between the worm wheel thereon and the rear face of the rear frame standard, so that the bracket may be rocked to a limited extent about the cam shaft as an axis, the bracket being held releasably and adjustably in fixed relations to the standard by means of upper and lower bolts 38 and 39 carried by the rear frame standard and which extend through arcuate slots 40 and 41 in the bracket, the purpose of which adjustable connection of the bracket with the frame will presently appear. The shaft 34 extends at its upper end beyond the bracket, at which point it has a detachable worm wheel 42, engaged by a worm 43 on the rear end of the chuck spindle, whereby the rotation of the chuck spindle will be imparted to the cam shaft and will act to impart the reciprocating movements to the slide 6.

The axially movable slide 9 before alluded to as carrying the operating tool 10 for operating on the peripheral face of the work, is in the present instance in the form of a horizontal bar 44 and a tool holder 50 carried by the bar, the latter extending in a fore and aft direction parallel with the chuck spindle and being mounted to slide axially and also to rock in suitable bearings in the upper ends of the frame standards. At its forward end and beyond the front frame standard the bar 44 has fixed to it a head 45 from which extends a lateral gravitating arm 46 which rests at its free end on a cam 47 on the upper end of a post 48 seated on the tool slide 6 and adjustably connected therewith by means of fastening bolts 48$^a$ extending through feet 48$^b$ on the post and having heads seated in an undercut groove 48$^c$ extending longitudinally of the slide. The head 45 on the sliding bar 44 is formed in its front face with an open recess provided with parallel guide ribs 49 extending radially of the axis of the chuck, and in these guides is mounted the tool holder 50 on the inner end of which the operating tool 10 is mounted. The tool holder is confined in the recess by a cover plate 51 bolted to the front face of the head and is adjustably mounted in the guides so that it may be moved outward and inward radially to correspondingly adjust the tool relatively to the work, by means of an adjusting screw 52 which is screwed through a yoke 53 on the head and which is swiveled at its inner end in the outer end of the tool holder so that by turning the screw the holder may be adjusted in its guides outwardly or inwardly according to the direction of turning movement. The tool holder is held firmly in its adjusted position by means of binding screws 54 threaded in the cover plate and bearing at their inner ends against the holder. This holder 50 projects some distance inwardly from the axis of the bar 44, the result being that when the bar is rocked on its axis by lifting the arm 46, the inner end of the tool holder will be swung upwardly so as to disengage the tool from the work, a slight lifting of the arm serving to lift the tool a slight distance from the work as shown in Fig. 4, while by swinging the arm clear over to the left the tool may be carried entirely free of the face of the chuck in order to avoid interference with the application and removal of the work.

The axial movement of the bar 44 will cause the operating tool to traverse the peripheral surface of the ring axially of the axis of rotation thereof, and with the arm in its lowered position as shown in Fig. 1, and with the tool in contact with the peripheral surface of the ring, the latter will be subjected to the operation of the tool.

The position of the tool with reference to the work is determined by the cam 47 before alluded to which supports the outer end of the arm 46, the said cam being provided with a low point 47$^a$ and a high point 47$^b$ which in the reciprocating movements of the slide 6 are engaged alternately and successively with the end of the arm, the weight of which arm causes it to maintain working contact with the cam. With the arm resting on the low point of the cam, the tool is supported in such position that it will engage the peripheral surface of the ring which is the position which the tool occupies as it is advanced axially by the advance of the bar 44, the movement of the cam by the slide 6 being so timed in relation to the axial movements of the tool, that at the moment that the tool begins its retracting movement, the high point of the cam will be engaged with the end of the arm and will thereby slightly lift the arm and will correspondingly lift the tool from engagement with the work, so that in the retracting movement of the tool it will be free of the work and will not drag thereover.

The effect of the arm 46, resting at its outer free end on the cam surface 47$^a$, is to give support to the tool 10 at a point distant from the point of connection of the tool holder 50 with the axially movable slide 9, it being noted that the arm 46, in the present instance is considerably greater in length than the distance from the tool 10 to the axis of the bar 44. This arm therefore gives a long leverage on the slide in proportion to the length of the leverage afforded by the tool holder 50, and it therefore supports the tool in a solid and firm manner and effectually prevents vibration, spring or chattering in the operation of the tool on the work.

The axial movements of the bar 44 are imparted thereto from the cam shaft 31, which for this purpose has fixed to it a cam drum 55 formed with a cam slot 56 in which engages a roller 57 at the lower end of an upright rocking member in the form of a lever 58. The lever is pivoted between its ends as at 59 to the frame of the machine, and above the pivot the lever is forked so as to extend on opposite sides of the bar 44. The forks of the lever have journaled to their inner sides rollers 59ª which engage between the inner adjacent ends of two nuts 60 screwed on a reduced threaded portion of the bar. The form of the cam groove 56 is such that in the rotation of the cam drum the lower end of the lever 58 will be vibrated back and forth and imparting to its upper end corresponding movements, the bar 44 will be reciprocated horizontally back and forth in its guides, the forward movement of the bar causing the tool 10 to advance along the peripheral surface of the work ring, and the rear movement of the bar causing the tool to be retracted relatively to the work. It will be noted that the operating tools are given their movements to act on the work from a common driving member, the drive shaft 14, which through the medium of the cam shaft 31 operated thereby, imparts reciprocating movements to the slide 6 by means of the rocking lever 24, and imparts reciprocating movements to the bar 44 by the rocking lever 58, the tool slides being thus coordinated in their movements. By these actions the tools 7 and 8 are caused to act on the side face of the work, and the tool 10 caused to act on the peripheral surface thereof.

The driving connections for these parts are so timed in their operations that in the complete cycle of operation or rotation of the cam shaft, the tool 7 will be advanced and will peform its work on the side of the ring while the tool 10 is advancing to perform its operation on the periphery of the same; and on the retreat of the tool 7, the tool 8 will advance to perform its work on the side of the ring, during which action the tool 10 will be retracted, the cam 47 in this latter movement being shifted so as to bring its high point 47ᵇ beneath the arm 6 and thereby lift and maintain the tool 10 free of the work.

In Fig. 1 the parts are in the position they occupy at the beginning of the cycle of operation, the slide 6 being in a position where both the tools 7 and 8 are free of the work, with the tool 10 in its retracted position as shown in Fig. 2, and the arm 46 supported by the low point of the cam so as to sustain the tool 10 in its lower position ready to act on the work. The machine is now at rest with the clutch disengaged. To start the operation the handle of the clutch lever is lifted, thereby throwing the clutch into action and rotating the drive shaft. As the various parts operated by the drive shaft begin their operation, the slide 6 will be moved to the right in Fig. 1, which will cause the tool 7 to advance and traverse the side face of the ring, and at the same time will cause the tool 10 to advance in an axial direction and traverse the peripheral surface of the ring, these motions continuing until the slide reaches the end of its movement to the right as shown in Fig. 3, with the low point of the cam supporting the arm 46 and the tool 10 at the limit of its forward movement. In the further movement of the parts to complete the cycle of operation, the slide 6 retreats and moves to the left, thereby retracting the tool 7 and moving the tool 8 to the left up to the work to perform its operation thereon, the cam 47 in this reverse movement being shifted so as to bring the high point of the cam beneath the arm 46, thereby lifting the tool 10 free of the work, the continued movement of the slide in this direction causing the tool 10 to return to its former position and at the same time carrying the tool 8 into engagement with the work as shown in Fig. 4. In the final movement in the cycle, the slide moves again to the right, thereby returning the tool 8 to its former position, bringing the tool 7 up to the point where it started and shifting the cam 47 to bring the low point beneath the arm 46, thereby lowering the tool 10 into its original position ready for action on a new work piece in the next cycle of operation. By the time the parts reach these relative positions, the clutch is automatically thrown out of action and the mechanism brought to rest, this being effected by means of a finger 61 pivoted at its inner end as at 62 to a bracket 63 projecting forwardly from the side of the cam drum. This finger projects at its end beyond the periphery of the drum, and with the clutch lever in position to connect the clutch, a roller 64 on the end of an arm 65 on the clutch operating lever 18ª stands in the path of the finger which latter, as the cam drum complete its revolution, will engage the roller 64 and rocking the clutch lever on its axis will disconnect the clutch, the lever being held yieldingly in this position by means of the pin 20 before alluded to engaging the roller 21 on the forward end of the clutch lever.

By means of the nuts 60 on the bar 44 between which the upper end of lever 58 engages the position of the latter in an axial direction may be adjusted by screwing the nuts to the left or right as the case may be, the adjustment of the nuts to the left causing the bar to be set at a greater distance forward, and the adjustment of the nuts in the opposite direction causing the bar to be set at a greater distance rearwardly.

The bracket 37 in which the shaft 34 is mounted may, by releasing the bolts 38 and 39, be rocked on the axis of the cam shaft and in this way disengage the worm wheel 42 from the worm 43, the purpose of this disengagement being to disconnect the driving connection between the drive shaft and the cam shaft, so that by rotating the shaft 34 by means of a hand wheel 65 fixed to the upper extended end of the shaft, the operating tools may be moved by hand as is desirable under certain conditions. The bracket 37 is held in place frictionally by the screws 38 and 39, and by regulating the degree of friction the bracket may be so set that it will be automatically shifted, in the event of the tools being subjected to undue resistance in their movement, by the co-action of the worm 43 against the worm 32, the bracket thus forming in effect a safety device which will in the event of undue obstruction being offered to the rotation of the cam shaft, prevent injury to the gears by the continued operation of the drive shaft. Also by reason of the adjustable connection of the bracket 37 to the frame, whereby shaft 34 may be sustained at different distances from the worm wheel 43, provision is made for employing worm wheels of different diameters to cooperate with the worm 43. As a result, the speed relations between the chuck spindle and cam shaft 31 may be changed, when the spindle is operated at a greater or less speed for different diameters of work rings.

While the machine illustrated is shown as equipped with a roughing tool 7 and a finishing tool 8 acting in succession on one side of the ring A, and with a tool 10 acting on the peripheral surface of the ring, it will be understood that it is not necessary to employ all these several tools in cooperation with each other, and that one or more may be operated alone, and the character of the tools may be changed so as to subject the work to various kinds of machining operations either singly or cooperatively, such as roughing, grooving, chamfering, finishing and like operations. Also by setting the tools which act on the side of the work to different positions axially of the work, they may be made to operate on both sides of the same instead of on one side only. This disposition of the tools in different positions axially of the work to act on both sides of the same is shown in Fig. 2, where it will be seen that one of the roughing tools 7 is set in position on its holder to act on the front face of the work, and a second roughing tool 7× is set in a different position on the tool holder in the direction of the axis of the work to act on the rear face of the same. It is understood that the finishing tool 8, may be likewise supplemented by an additional finishing tool positioned on the tool holder to act on the rear face of the work on that side, although this is not shown in the drawings on account of the character of the views.

It will be understood further that while in the particular form of mechanism shown, the work ring is gripped internally so that its external axially extending surface may be operated on, the machine may be employed for operating on the bore or interior axially extending surface of the work, in which event the chuck will be of a form to grip the work externally so as to expose its inner surface, and the tool holder 50 may be extended to overhang the front of the work and be equipped with a suitable tool for operating on the inner surface of the ring to groove or finish or otherwise machine the same as occasion requires.

In the foregoing description and accompanying drawings I have set forth my invention in the particular detailed form which I prefer to adopt and which in practice has been found to answer to an admirable degree the objects to be attained. It will be manifest, however, that these details may be variously changed and modified without departing from the limits of my invention; and it will be understood that the invention is not limited to any particular form or construction of the parts except in so far as such limitations are specified in the claims.

Having thus described my invention, what I claim is:

1. In a machine of the type described, the combination of a rotary work holder adapted to hold an annular work piece with its side face and axially extending surface exposed, a tool carrying slide movable transversely relatively to the axis of rotation of the work holder, a roughing tool and a finishing tool carried by said slide and spaced from each other in the direction of movement of the slide, said tools adapted in the movements of the slide to traverse the opposite portions of the side of the work in succession, an axially movable tool carrying slide, an operating tool mounted thereon and adapted in the movements of the slide to advance and traverse the axially extending surface of the work, and retreat for another operation, an operating member for the tool carrying slides, and connections between said operating member and the respective slides, said connections being of a form to cause one of the transversely movable tools to advance and act on the side of the work, simultaneously with the advance of the axially movable tool, and the other transversely movable tool to advance and act on the side of the work simultaneously with the retreat of the axially movable tool.

2. In a machine of the type described, the combination of a rotary work holder adapted to hold an annular work piece with its side face and axially extending surface exposed, a tool-carrying slide movable transversely of the axis of rotation of the work holder, an operating tool mounted on said slide and adapted in the movements of the slide to act on the side of the work, a second tool-carrying slide movable axially of the work and rockable transversely of its direction of movement, a tool holder carried by said slide and movable in the rocking movements of the slide to and from the work and adapted to carry an operating tool, means for moving the said tool slide, and means controlled by the movement of the transversely movable slide for moving the tool holder away from the work.

3. In a machine of the type described, the combination of a rotary work holder adapted to hold and rotate a work piece, a tool-carrying slide movable axially of the work piece and rockable about an axis extending parallel with its path of movement, said slide provided with a tool holder extending transversely therefrom and having an operating tool adapted in the axial movements of the slide to advance and retreat axially of the work, an arm connected with the slide and extending laterally therefrom to rock the slide on its axis and thereby move the operating tool to and from the work piece, and a cam acting on the arm to control the rocking movements of the same, the form of the cam and its relation to the arm being such as to cause the slide to be rocked on its axis and free the tool from the work when the tool retreats after its advancing cutting action.

4. In a machine of the type described, the combination of a rotary work holder, a reciprocating tool-carrying slide rockable transversely of its path of movement, means for reciprocating the same, a tool holder carried by said slide and movable in the rocking motions of the slide to and from the work, an operating tool mounted on the holder and adapted on the advance of the same to traverse the work in engagement therewith, a second tool-carrying slide coordinated in its movements with the other slide, and means carried by said second slide and adapted when the first mentioned slide is retracted to automatically rock the same and move the tool holder away from the work to disengage the tool therefrom.

5. In a machine of the type described, the combination of a rotary work holder adapted to hold an annular work piece with its side face and axially extending surface exposed, a transversely movable tool-carrying slide, an operating tool carried thereby and adapted to act on the side of the work, an axially reciprocating tool slide rockable transversely of its path of movement, a tool holder carried thereby and movable in the rocking motions of the slide to and from the work, an operating tool mounted in the tool holder and adapted when the slide is advanced to traverse the periphery of the work, and a cam movable with the transversely movable slide and adapted to operatively engage the tool holder and rock the slide and thereby move the holder away from the work on the retreat of said holder.

6. In a machine of the type described, the combination of a frame, a rotary work holder mounted therein and adapted to hold an annular work piece with its side face and axially extending surface exposed, a tool-carrying slide mounted on the frame and movable transversely relatively to the axis of rotation of the holder, an operating tool mounted on said slide and adapted to act on the side of the work, an axially movable tool slide mounted in the frame and rockable about its axis of movement, a tool holder on the slide carrying a tool adapted in the rocking movements of the slide to be moved to and from the work, an arm on the axially movable slide, and a cam on the transversely movable slide engaging said arm and controlling the rocking movements of the axially movable slide, said slides being so coordinated in their movements that in the movement of the axial slide in one direction, the operating tool will traverse the work in engagement therewith, and in the movement of the slide in the opposite direction the tool will be moved by the cam free of the work.

7. In a machine of the type described, the combination of a frame, a rotary chuck spindle mounted therein and carrying a work holding chuck, a tool-carrying slide mounted on the frame and movable transversely of the axis of rotation of said spindle and carrying an operating tool, a second tool-carrying slide mounted in the frame and movable axially and carrying an operating tool to act on the work, a drive shaft mounted in the frame and geared to the chuck spindle to rotate the same, a cam shaft mounted in the frame and driven by the chuck spindle, a cam on said shaft, a rocking member operated by said cam and operatively connected with the axially movable slide for reciprocating the same, a second cam on the cam shaft, and a rocking member operated by said second cam and operatively connected with the transversely movable tool slide for reciprocating the same.

8. In a machine of the type described, the combination of a frame, a rotary chuck spindle mounted therein, a cam shaft also mounted in the frame, a reciprocating tool carrying slide operated by the cam shaft, a bracket member applied to the frame and adjustable about the axis of the cam shaft, a transmitting shaft for transmitting motion from the chuck spindle to the cam shaft, said transmitting shaft being mounted in bearings in the bracket member, a worm on the chuck spindle, a worm wheel removably mounted on the transmitting shaft and engaged by said worm, a worm on the transmitting shaft, and a worm wheel on the cam shaft engaged by said last mentioned worm.

9. In a machine of the type described, the combination of a frame, a rotary chuck spindle mounted therein, means for driving the same, a rotary shaft mounted in the frame parallel with the chuck spindle, a tool carrying slide operated by the rotary shaft, a bracket member applied to the frame and movable about the axis of the rotary shaft, means for frictionally holding the bracket member against movement, a transmitting shaft journalled in bearings on the bracket member for transmitting motion from the spindle to the rotary shaft, intermeshing gears on the rotary shaft and transmitting shaft, and intermeshing gears on the spindle and transmitting shaft.

10. In a machine of the type described, the combination of a work holder, a reciprocating tool holder provided with an operating tool and rockable transversely of its reciprocating movement to engage and disengage the tool relative to the work, means for reciprocating the tool holder axially of the work, a gravitating arm operatively connected with the tool holder, and a movable supporting member on which the arm rests, said member adapted in its movements to control the rocking movements of the arm.

11. In a machine of the type described, the combination of a rotary work holder, a reciprocating tool holder provided with an operating tool, means for reciprocating the same axially of the work, said holder being rockable transversely of its axial movements to engage and disengage the tool from the work, an arm operatively connected with the tool holder, and a cam acting on the arm to control its movements.

12. In a machine of the type described, the combination of a rotary work holder, a reciprocating tool holder provided with an operating tool, means for reciprocating the holder axially of the work, said holder being rockable about an axis parallel with the path of its axial movement to engage and disengage the tool from the work, an arm operatively connected with the tool holder and extending transversely of the path of the axial movement of the same, and means for movably supporting said arm at a point distant from the axis of the tool holder.

13. In a machine of the type described, the combination of a rotary work holder, a reciprocating tool holder provided with an operating tool, means for reciprocating said holder axially of the work, said tool holder being rockable about an axis parallel with its line of movement to engage and disengage the tool from the work, an arm operatively connected with the tool holder and extending transversely of the line of movement of the same, said arm being of greater length than the distance of the tool from the pivotal axis of the tool holder, and means for movably supporting said arm.

14. In a machine of the type described, the combination of a rotary work holder adapted to hold an annular work piece with its side face and axially extending surface exposed, a tool-carrying slide movable transversely relatively to the axis of rotation of the work holder, a roughing tool and a finishing tool carried by said slide and spaced apart from each other in the direction of movement of the slide, means for moving the slide first in one direction to cause the roughing tool to traverse the work on one side of its axis, and then in the opposite direction to disengage the roughing tool from the work and to cause the finishing tool to traverse the work at the opposite side of its axis, and finally in the direction of the first movement to disengage both tools from the work, a second tool-carrying slide movable axially of the work and rockable about its path of movement and having a tool holder provided with an operating tool to act on the axially extending surface of the work, said latter holder being movable up and down in the rocking movements of the slide to respectively disengage and engage the tool with the work, means controlled by the operating means of the first slide for lowering the tool of the axial slide to cause the same to advance and traverse the work in engagement with the same when the roughing tool acts on the side of the work, and for raising the tool holder to cause the tool to retreat out of engagement with the work when the finishing tool is acting on the work, and means operating when the roughing and finishing tools are moved free of the work, to again lower the axial tool so that it will be in position to engage the work when it is advanced for the next operation.

15. In a machine of the type described, the combination of a rotary work holder adapted to hold an annular work piece with its side faces and axially extending surface exposed, a tool-carrying slide movable transversely relatively to the axis of rotation of the work holder, operating tools carried by said slide and spaced apart in a direction axially of the work to act on the front and rear faces of the same when the slide is moved transversely, a second tool-carrying slide movable axially of the work, an operating tool carried by the slide to act on the axially extending surface of the work when the slide is moved axially, a common operating member, and connections from said operating member to the respective slides formed and constructed to move said slides transversely and axially respectively; whereby the three exposed faces of the work will be machined in one cycle of operation.

16. In a machine of the type described, the combination of a rotary work holder adapted to hold an annular work piece with its side face and axially extending surface exposed, a tool holder movable transversely of the axis of rotation of the work holder and provided with an operating tool adapted in the movements of the holder to act on the side of the work, a second tool holder movable axially of the work and also to and from the work and provided with an operating tool to act on the axial surface of the work, means for moving said tool holder axially, and means controlled by the movement of the transversely movable tool holder for moving the other tool holder to and from the work.

17. In a machine of the type described, the combination of a rotary work holder, a reciprocating tool holder rockable transversely of its path of movement, means for reciprocating the tool holder, an operating tool mounted on the holder to traverse the work in engagement therewith, a second tool holder coordinated in its movements with the first, and means movable with the second holder and adapted when the first mentioned holder is retracted, to automatically move the same away from the work to disengage the tool therefrom.

18. In a machine of the type described, the combination of a rotary work holder adapted to hold an annular work piece with its side face and axially extending surface exposed, a transversely movable tool holder provided with an operating tool adapted to act on the side of the work, an axially reciprocating tool holder rockable transversely of its path of movement and provided with an operating tool adapted when the tool holder is advanced, to traverse the axially extending surface of the work, and a cam movable with the transversely movable tool holder and operatively engaging the other tool holder to rock the same and thereby move the tool away from the work on the retreat of the holder.

19. In a machine of the type described, the combination of means for holding the work with two different side surfaces and a circumferential surface presented for operation, a movable tool carrying slide, two operating tools sustained by said slide to act on said side surfaces of the work, a second movable tool carrying slide, a third operating tool sustained by said latter slide to act on the circumferential surface of the work, a common operating means for said slides, and connections between said operating means and the two slides respectively to cause said tools to act in coordination with each other on said surfaces.

20. In a machine of the type described, the combination of means for holding the work with two different side surfaces and a circumferential surface presented for operation, two operating tools sustained to act on said side surfaces, a third operating tool sustained to act on the circumferential surface, operating means arranged to act in successive cycles of operation and then automatically come to rest, and connections between said operating means and the two sets of tools respectively to cause them to act on the three surfaces of the work during a single cycle of said operating means.

21. In a machine of the type described, the combination of a rotary work holder adapted to hold an annular work piece with its side face and axially extending face presented for operation, two tools movable transversely of the axis of rotation and adapted in their movements to traverse opposite portions of the side of the work in succession, a third tool movable axially to advance and traverse the axially extending face of the work and to retreat for another operation, operating means for said tools, and connections between said means and the respective tools, said connections being of a form to cause one of the transversely movable tools to advance and act on the side of the work simultaneously with the advance of the axially movable tool, and the other transversely movable tool to advance and act on the side of the work simultaneously with the retreat of the axially movable tool.

22. In a machine of the type described, the combination of a rotary work holder adapted to hold an annular work piece with its side face and axially extending face presented for operation, an operating tool movable transversely of the axis of rotation and adapted to act on the side of the work, a tool movable axially of the work to act on the axial face thereof and rockable transversely of the work to disengage said face, and means controlled by the transversely movable tool for rocking the axially movable tool transversely.

In testimony whereof, I have affixed my signature.

FRED E. BRIGHT.